POLYSTABLE TRIGGER CIRCUIT

Filed Dec. 28, 1955

INVENTORS
ARTHUR H. DICKINSON
ROBERT C. PAULSEN
BY [signature]
ATTORNEY 2,901,608
Patented Aug. 25, 1959

2,901,608

POLYSTABLE TRIGGER CIRCUIT

Robert C. Paulsen, Boonton, N.J., and Arthur H. Dickinson, Greenwich, Conn., assignors to International Business Machines Corporation, New York, N.Y., a corporation of New York Application December 28, 1955, Serial No. 555,859

3 Claims. (Cl. 250—27)

Figure 1:
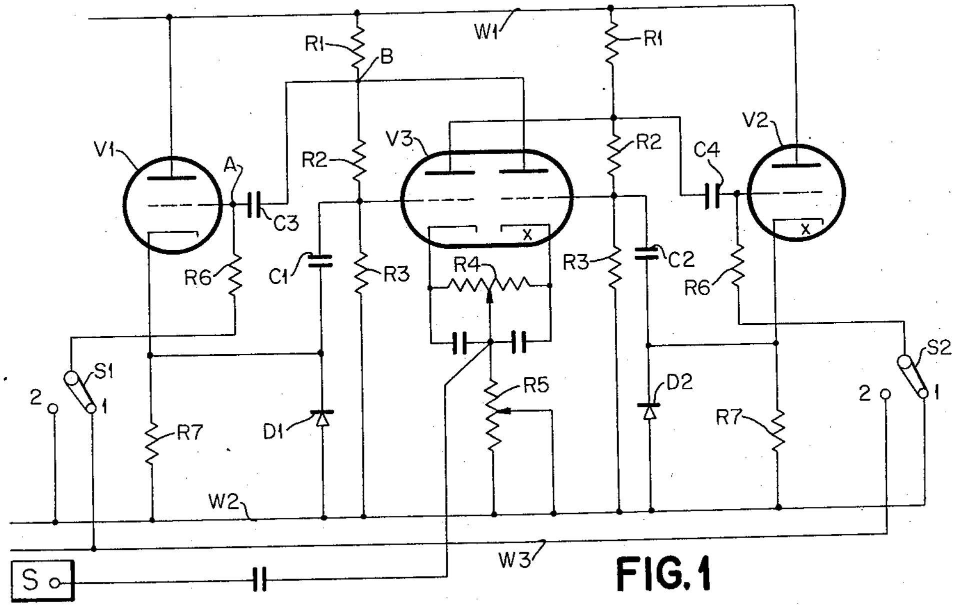

This invention relates to electronic data processing machines.

The primary object of the present invention is to provide a reversible polystable trigger circuit which has numerous applications in electronic data processing and allied electronic equipment.

An object is to provide a polystable trigger circuit which is particularly useful in electronic accounting and computing machines.

An object is to provide a reversible trigger circuit which makes possible a considerable simplification in the wiring and thereby effects a reduction in power requirements, space, and heat radiation in the equipment in which it is used. These benefits cumulatively have the effect of very substantially reducing the cost of the equipment.

An object is to provide a polystable trigger circuit with a simple means by which the triggering sequence may be reversed.

An object is to provide a reversible polystable trigger circuit which is particularly useful in the construction of registers and storage devices. An illustration of the benefits derived from such a circuit is had in application Serial No. 555,811 filed December 28, 1955 by A. H. Dickinson, now Patent No. 2,858,432, disclosing a register or storage device embodying the trigger circuit disclosed herein.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 comprises a wiring diagram of a selectively reversible trigger circuit having the features of the invention disclosed herein.

Figure 2A:
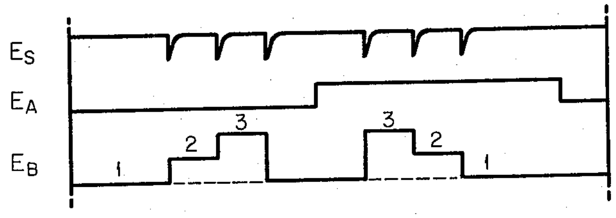
Figure 2B:
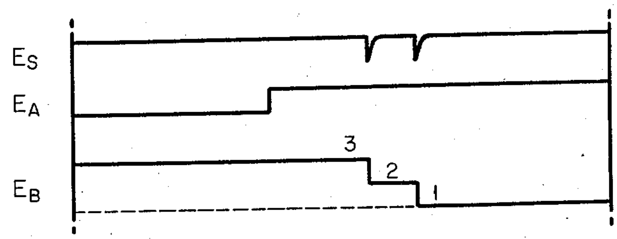

Figs. 2A to 2B are series of charts showing sequences of triggering operations resulting when the reversing of the trigger takes place under different stable states of the trigger.

An article by Booth and Ringrose in Electronic Engineering for April 1951 discloses a simple form of polystable trigger circuit which is capable of being set in three different stable states. This trigger circuit has been found to be somewhat unstable in its operation, and one of the features of the invention disclosed here is the provision of means to improve the stability of the trigger circuit and make it more dependable when used in critical applications like electronic data processing machines where there must be a large factor of safety in the operation of such a circuit to insure that calculations will be accurately carried out.

Basically the trigger circuit, as originally disclosed in such article, is a modified form of the conventional Eccles-Jordan trigger which in its essence consists of cross-coupled triode amplifiers arranged so that each has its output connected to the input of the other and always assumes one of two states in which one of the tubes of the pair usually employed is fully conductive while the other is nonconductive. This circuit has been modified by Booth and Ringrose to the extent of removing the cross-coupling condensers in the voltage divider networks except for one across one of the resistors which couples the grid of one tube to the anode of the other. This trigger circuit is not reversible but always follows the same sequence of triggering operations comprising three states in which (1) one tube is fully conductive while the other is nonconductive, (2) both tubes are conductive, and (3) the second tube is conductive and the first tube is nonconductive.

According to the present invention there is provided an electronic switching circuit which is selectively controllable to have the effect of uncoupling the cross-coupling condenser for the tube on one side of the trigger network and reconnecting it to the corresponding resistor for the other tube of the trigger circuit.

The primary purpose of the present invention is to provide a means whereby the sequence of the trigger may be reversed. In Fig. 1 the resistors R1, R2, R3 and the dual triode V3 are wired similarly to the resistor network of a conventional Eccles-Jordan trigger with the values of the resistors so chosen that with only one of the condensers C3, C4 made effective the trigger circuit functions as a polystable trigger. Associated with the separate triodes of the tube V3 are the switching tubes V1, V2, the grids of which may be selectively coupled to either the zero bias wire W2 or negative bias wire W3 so that the bias on the tubes V1, V2 may be selectively changed.

Normally for sequencing in a forward, or what might be termed an additive direction, the switches S1, S2 are set in position 1 in which tube V1 is biased to cutoff and tube V2 is biased so as to tend to conduct slightly. The wire W2 may be at cathode potential and wire W3 at a negative potential which is related to the operating characteristics of the tubes V1, V2. Under these conditions it will now be assumed that a negative triggering pulse $E_S$ (Fig. 2A) from source S is applied to the cathode resistor R5. Under the assumed starting conditions the right-hand triode of tube V3 (Fig. 1) will be fully conductive and the left-hand triode nonconductive, maintaining the trigger circuit in the first stable state, as indicated by the small "*x*" between grid and cathode. In state 1 the potential $E_B$ at point A (Fig. 1) is at a minimum (Fig. 2A).

Figure 2C:
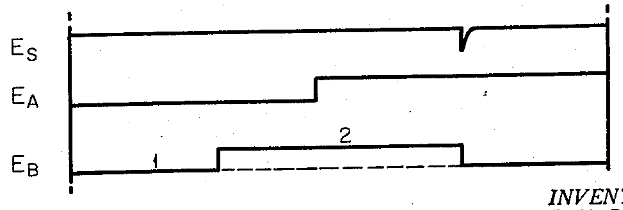

The application of the negative pulse from source S has the same effect as driving the grid of the right-hand triode positive and tends to cause the right-hand triode to conduct, but produces substantially little potential change at point B since, for the selected values of the various circuit components, the right-hand triode is operating at substantially saturation at this time. The left-hand triode, being in a non-conductive condition at the start, is made more conductive by the negative triggering pulse and starts to conduct. This causes the potential on the grid of the right-hand triode of tube V3 to fall, momentarily reducing the conduction of this triode and causing the potential at point B to rise to an intermediate value (Fig. 2A). It will, of course, be appreciated that this action takes place very rapidly and, as a consequence, a positive pulse is transmitted through condenser C3 to the grid of tube V1 thereby causing it to conduct. The potential on the cathode of tube V1 rises sharply due to increased potential drop across resistor R7 producing a positive pulse which is transmitted to the grid of the left-hand triode of tube V3 through condenser C1 tending to make the left-hand triode more conductive. In the operation of the basic tristable trigger, the same effect is produced as if a condenser, namely C3, had been connected across resistor R2 and, for reasons not completely known, the trigger circuit including tube V3 assumes an intermediate stable state with both triodes conductive. This is the second stable state of the trigger circuit. In Figs. 2A to 2C the small numerals 1, 2, 3 designate the potentials $E_B$ at point B for the three different stable states.

It will be noted in Fig. 1 that the cathodes of tube V3 are interconnected by a potentiometer R4 of which the slider is connected to ground or wire W2 through the resistive element and slider of the potentiometer R5. The tapped portions of R4 are shunted by suitable condensers and the potentiometer R4 is adjusted to promote stability of the trigger circuit during the intermediate state when both triodes are conductive.

The increased conduction of the left-hand triode of tube V3 causes a negative pulse to be applied through condenser C4 to the grid of triode V2 but this does not appear to have any practical effect on the operation of the trigger circuit.

Now let it be assumed that a second triggering pulse is applied to the trigger circuit from source S. This tends to cause both triodes of tube V3 to conduct more strongly. It will be noted in Fig. 1 that since condensers C1, C2 are connected in parallel with resistors R3 through the diodes D1, D2 they inherently will receive a charge which in the present instance is believed to have an important effect in causing the ultimate conduction of the left-hand triode to produce the third stable state of the trigger. Tube V1 is nonconducting due to the fact that its grid is connected to the bias line W3 by switch S1. Consequently the condenser C1 is in effect connected between the cathode and the grid of the left-hand triode V3 across resistor R3. On the other hand tube V2 is fully conductive with the result that its cathode is at a higher potential so that there is somewhat less charge on condenser C2 than on condenser C1. Consequently when the negative triggering pulse is applied from source S to both cathodes of tube V3 the initial tendency of both tubes to conduct equally is offset due to the fact that the potential on condenser C1 holds the grid of the left-hand triode of V3 positive due to its slightly greater charge and the tendency is for the left-hand triode to conduct more fully than the right-hand triode or rather to resist a tendency to make it less conductive. One the other hand this tendency of the left-hand triode to conduct more rapidly than the right-hand triode causes the potential on the grid of the right-hand triode to fall thereby driving the right-hand triode toward cutoff. This in turn causes the potential at point B to tend to rise rapidly and produce a positive pulse which has substantially the same effect through the condensers C3 and C1, as described above, of driving the left-hand grid of tube V3 even more positive. The action is rapidly cumulative, as is the case with all trigger circuits, with the result that the left-hand triode V3 becomes fully conductive and the right-hand triode cut off. This constitutes the third stable state of the trigger circuit and it will remain in this state until it is again triggered by a pulse from source S. The potential $E_B$ at point B is now at a maximum (Fig. 2A).

It will now be assumed that a third pulse is applied from source S to restore the trigger circuit to its first stable state. This pulse tends to make both triodes of tube V3 conductive. However, the left-hand triode is now fully conductive and with respect to it the pulse has little effect. A negative pulse is produced at point B which is effective to drive the left-hand triode of tube V3 to cutoff thereby causing the potential on the grid of the right-hand triode to rise. The action is cumulative and, for reasons not fully understood at the present time, the right-hand triode is driven toward full conduction, rather than to an intermediate point, in contradistinction to the effect of the first pulse discussed above which caused the trigger circuit to assume its second stable state with both triodes partially conducting approximately equal extents. As is usual with trigger circuits of this type, and in particular to the well-known Eccles-Jordan circuit, there are cumulative effects and it is not fully known just which effect is the more dominant in causing the trigger to be driven toward a particular state which in this case, is the the full conduction, under these conditions, of the right-hand triode.

In Fig. 2A the successive steps of operation just described are shown in terms of the necessary change in bias voltage $E_A$ effected by the settings of the switches S1, S2 and the first step-like "waveform" on the left showing the potential changes $E_B$ at point B.

It will now be assumed that it is desired to reverse the action of the trigger circuit while the circuit is still in the third stable state and, with switches S1, S2 set in position 2, the trigger circuit is again pulsed three times. This causes the step-like "waveform" of voltage $E_B$ shown at the right (Fig. 2A) which may be considered as a mirror image of the waveform produced by the series of operations first described above, and it will be noted that with the first triggering pulse the left-hand triode will become fully conductive and potential $E_B$ rises to a maximum. The second triggering pulse causes the triodes to assume the intermediate, simultaneous conduction state, while the third pulse restores the circuit to its original state with $E_B$ at a minimum.

The detailed operation is substantially as described above which can be readily understood by assuming that the wiring diagram has been rotated about a vertical axis passing through the center of the tube V3 which it will be seen that insofar as the wiring is concerned recreates the same conditions as now shown in Fig. 1, the circuits being as nearly perfectly symmetrical as it is possible to obtain with conventional components and adjustment of the potentiometers R4, R5.

In Figs. 2B and 2C there is shown the sequence which takes place to restore the trigger circuit to the first stable state on the assumption that the reversal takes place while the trigger is in the third and second stable states, respectively. Actually, these are the same conditions as take place after the first and second pulses have been applied with switches S1, S2 set in position 2, as last described above. If the source S consists of some form of oscillator which periodically produces triggering pulses, there will be produced a series of steplike waveforms similar to the one at the left in Fig. 2A when switches S1, S2 are in the position 1; whereas, in the position of Fig. 2, a succession of waveforms like the one at the right in Fig. 2A will be produced. It has been found that one of the principal advantages of the circuit disclosed herein is that there is a wider choice in the selection of components and the values are not as critical as in the case of the circuit described by Booth and Ringrose in Electronic Engineering.

It has been found that the following circuit components, none of which are very critical, cause the circuit to operate in the manner described:

| | |
|---|---|
| R1 | 22,000 ohms. |
| R2, R3 | 33,000 ohms. |
| R4 | 500 ohms. |
| R5 | 5,000 ohms (maximum). |
| R6 | 5 megohms. |
| R7 | 5,000 ohms. |
| C1, C2 | 100 mmf. |
| C2, C4 | 50 mmf. |
| V1, V2, V3 | 6SN7, 12SN7, or 12AU7. |

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A reversible tristable trigger circuit comprising a pair of symmetrical resistance networks, a pair of amplifiers, each having an input connected to a point on one of the networks and an output connected to a different point on the other network to form a basic trigger circuit, a pair of cathode follower switch tubes each having an input coupled to said first point on one of the networks and an output capacitatively coupled to said different point on said different point of the same network, said capacitative coupling, when the associated switch tube is biased to function as an amplifier, causing said networks and tube to function as a tristable trigger circuit, each said switch tube and its capacitative coupling causing a different triggering sequence; and selective means for biasing said switch tubes to render one of said tubes effective as an amplifier.

2. A reversible tristable trigger circuit comprising a pair of voltage dividers, each tapped at two points of medium and low potential; a pair of electronic trigger tubes, each having an anode coupled to the medium potential point of one of the voltage dividers, a control grid connected to the low potential point of the other voltage divider, and a cathode connected to the cathode of the other tube to receive triggering pulses; a second pair of electronic tubes having a cathode, a cathode load resistor capacitatively coupled to the lower potential point of one of the voltage dividers, and a control grid capacitatively coupled to the medium potential point of said one voltage divider, whereby each of said second pair of tubes functions as a cathode follower amplifier coupling between the medium and low potential points of one of the voltage dividers; two different bias sources for the control grids of said second pair of tubes, and selective switching means settable to connect one of said last named grids to one of said bias sources and the other grid to the other of said bias sources to cause a predetermined one of said second tubes to function as an amplifier and settable to connect the grids of said second tubes to said bias sources in the opposite source to cause the other of said second tubes to function as an amplifier.

3. In combination, a pair of voltage divider networks; a pair of electron tubes each having an electrode connected to a point of intermediate potential on one of said networks, a second electrode connected to a point of lower potential on the other network, and a third electrode coupled to a point of still lower potential than the second electrode; a pair of cathode follower type switch circuits, one for each network, each switch circuit having a load resistor, an input coupled to the intermediate potential point of the associated network and an output from said load resistor coupled to the lower potential point of the associated network; a pair of rectifying devices, each shunting one of said load resistors; and selective switch means for rendering the switch circuits effective.

References Cited in the file of this patent

UNITED STATES PATENTS

| | | |
|---|---|---|
| 2,506,439 | Bergfors | May 2, 1950 |
| 2,540,539 | Moore | Feb. 6, 1951 |
| 2,545,924 | Johnstone | Mar. 20, 1951 |
| 2,562,530 | Dickinson | July 31, 1951 |
| 2,636,985 | Weissman | Apr. 28, 1953 |
| 2,647,999 | Best | Aug. 4, 1953 |
| 2,666,852 | Hollingsworth | Jan. 19, 1954 |